United States Patent
Lo et al.

(10) Patent No.: US 6,792,275 B1
(45) Date of Patent: Sep. 14, 2004

(54) FUZZY CHANNEL ALLOCATION CONTROLLER HAVING SERVICE QUALITY INSURING

(75) Inventors: Kuenrong Lo, Taoyuan (TW); Chungju Chang, Taoyuan (TW)

(73) Assignee: Telecommunication Laboratories, Changhwa Telecom Co., Ltd., Taoyuan (TW)

( * ) Notice: Subject to any disclaimer, the term of this patent is extended or adjusted under 35 U.S.C. 154(b) by 0 days.

(21) Appl. No.: 09/807,442

(22) PCT Filed: Dec. 23, 1998

(86) PCT No.: PCT/CN98/00314

§ 371 (c)(1),
(2), (4) Date: Apr. 25, 2001

(87) PCT Pub. No.: WO00/40042

PCT Pub. Date: Jul. 6, 2000

(51) Int. Cl.⁷ .............................................. H04Q 7/20
(52) U.S. Cl. .................... 455/452.2; 455/436; 455/453; 455/444; 370/329; 370/331; 370/341
(58) Field of Search ............................. 455/422.1, 436, 455/439, 441, 443, 450, 451, 452.1, 452.2, 453, 509, 464, 449, 444, 445; 370/329, 331, 341; 375/130

(56) References Cited

U.S. PATENT DOCUMENTS

| | | | | |
|---|---|---|---|---|
| 5,265,263 A | * | 11/1993 | Ramsdale et al. | 455/441 |
| 5,557,657 A | * | 9/1996 | Barnett | 455/444 |
| 5,722,072 A | * | 2/1998 | Crichton et al. | 455/437 |
| 5,778,317 A | * | 7/1998 | Kaminsky | 455/450 |
| 5,884,178 A | * | 3/1999 | Ericsson et al. | 455/441 |
| 5,937,353 A | * | 8/1999 | Fapojuwo | 455/444 |
| 6,005,852 A | * | 12/1999 | Kokko et al. | 370/329 |
| 6,052,594 A | * | 4/2000 | Chuang et al. | 455/450 |
| 6,055,432 A | * | 4/2000 | Haleem et al. | 455/452.1 |
| 6,067,287 A | * | 5/2000 | Chung-Ju et al. | 370/232 |
| 6,081,722 A | * | 6/2000 | Duque-Anton et al. | 455/452.2 |
| 6,144,856 A | * | 11/2000 | Ko | 455/436 |
| 6,175,735 B1 | * | 1/2001 | Meyer | 455/440 |
| 6,181,941 B1 | * | 1/2001 | McCarthy | 455/436 |
| 6,212,389 B1 | * | 4/2001 | Fapojuwo | 455/453 |
| 6,381,463 B1 | * | 4/2002 | Tu et al. | 455/456.5 |
| 6,385,454 B1 | * | 5/2002 | Bahl et al. | 455/450 |
| 6,539,228 B1 | * | 3/2003 | Tateson | 455/446 |
| 6,631,270 B1 | * | 10/2003 | Dolan | 455/453 |

OTHER PUBLICATIONS

Lo et al., A QoS–Guaranteed Fuzzy Channel Allocation Controller For Hierarchical Cellular Systems, Sep. 2000, IEEE, vol. 49, No. 5, pp. 1588–1598.*

Lo et al., A QoS–Guaranteed Fuzzy Channel Allocation Controller For Hierarchical Systems, 1999, IEEE, pp. 2428–2432.*

Abdul–Haleem et al., Aggressive Fuzzy Distributed Dynamic Channel Assignment Algorithm, 1995, IEEE, pp. 423–427.*

Edwards et al., A New Hand–off Algorithm Using Fuzzy Logic, 1994, IEEE, pp. 89–92.*

* cited by examiner

*Primary Examiner*—Charles Appiah
*Assistant Examiner*—Willie J. Daniel, Jr.
(74) *Attorney, Agent, or Firm*—Rosenberg, Klein & Lee

(57) ABSTRACT

A fuzzy channel allocation controller assuring a quality of service and used in a hierarchical wireless communication system. A system with the fuzzy channel allocation controller is provided, and a threshold for allowing a call entering into the system is adaptively adjusted according to system condition so that the calls are sustained in a predetermined quality. Furthermore, in allocating channels, the loads of the macro cell and micro cells are balanced so that the system has a higher channel utility. This system having a macro cell and a plurality of micro cells which includes a base station interface module, a resource estimator, and a performance estimator and a fuzzy channel allocation processor.

4 Claims, 3 Drawing Sheets

FUZZY CHANNEL ALLOCATION CONTROLLER HAVING SERVICE QUALITY INSURING

This application is a 371 of PCT/CN98/00314 filed Dec. 23, 1998.

FIELD OF THE INVENTION

The present invention relates to a fuzzy channel allocation controller. A threshold for allowing a call entering into the system is adaptively adjusted so that the calls are sustained in a predetermined quality.

BACKGROUND OF THE INVENTION

With the increasing development of wireless communication, wireless communication has become more and more important in the human daily life. The frequency spectrum is an important resource in wireless communication. How to use the spectrum resource effectively so as to increase the system capacity and quality of service is a critical problem in wireless technology.

In the conventional channel allocation, methods for sustaining quality of service in handoff calls is to leave part of channels to the handoff calls having a higher priority. While how many channels are required to be left so as to sustain quality of service and to cause the utility of channels achieves an optimum level is a key problem. It is often that a system with a random variation of loads is very difficult since the complexities of the system module and mathematical deduction. The fuzzy channel allocation controller of the present invention has got a result from a system simulation. Comparing with the conventional channel allocation ways, the fuzzy channel allocation controller of the present invention substantially sustains the quality of service and has a higher utility of channels.

SUMMARY OF THE INVENTION

Accordingly, the primary object of the present invention is to provide a fuzzy channel allocation controller. A threshold for allowing a call entering into the system is adaptively adjusted according to system condition so that the calls are sustained in a predetermined quality. Furthermore, in allocating channels, the loads of the macro cell and micro cells are balanced so that the system has a higher channel utility.

To achieve above objects, the present invention provides a fuzzy channel allocation controller which includes a base station interface module, a resource estimator, a performance estimator and a fuzzy channel allocation processor. The base station interface module provides an interface circuit to interface with a base station, and provides separated buffers for registering calls temporarily. The function of the resource estimator is to calculate effective resource as a call occurs, which includes space channels and buffers; and the function of the performance estimator is to adaptively estimate performance of the system.

The various objects and advantages of the present invention will be more readily understood from the following detailed description when read in conjunction with the appended drawing.

DETAILED DESCRIPTION OF THE PREFERRED EMBODIMENTS

In a fuzzy channel allocation controller, a complete-partitioning buffer serves to register calls not being stored due to no dummy channel for reducing the failure of calling and enhancing quality of service.

Figure 1:
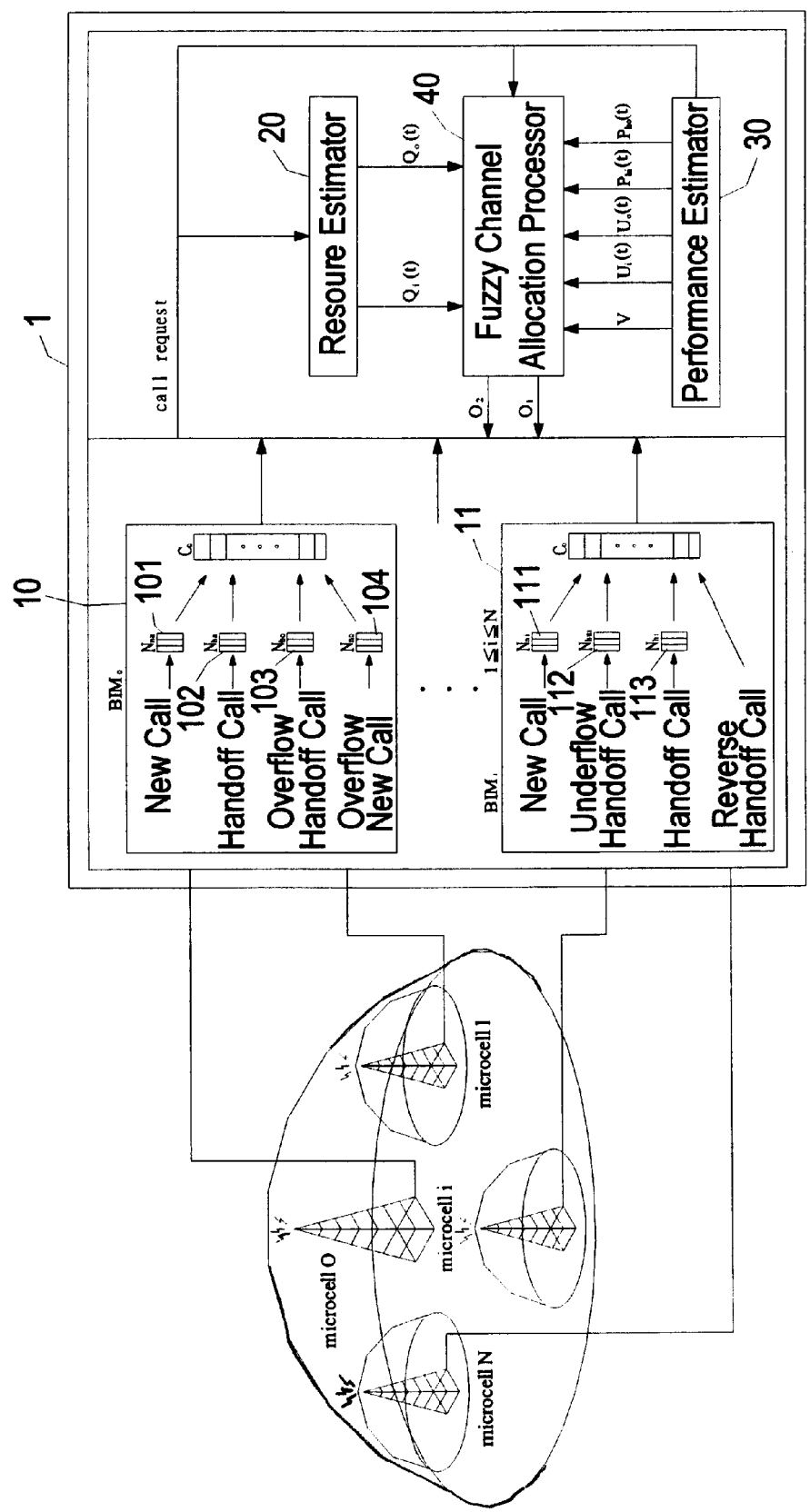
FIG. 1 is the system construction of fuzzy channel allocation controller assuring a quality of service and used in a hierarchical wireless communication system in the present invention.

In the present invention, a fuzzy channel allocation controller with an assurance of quality of service. Referring to FIG. 1, the fuzzy channel allocation controller of the present invention includes a base station interface module 10 (BIM), a resource estimator 20, a performance estimator 30 and a fuzzy channel allocation processor 40. The base station interface module 10 has a plurality of buffers for being used by various calls. A macro cell has Nna buffers 101 for new calls, Nha buffers 102 for handoff calls from proximate macro cells, and Nho buffers for the overflow handoff calls of a micro cell. Ith base station interface module 10 provides Nni buffers for new calls in the micro cells. Nhui buffers 112 serves for the underflow handoff calls of a macro cell. Nhi buffers 113 serves for the handoff calls of proximate micro cells. Besides, when dummy channels exist in one micro cell, the calling reverse flow being executing in a macro cell is allowable to be handoff to the channels of micro cells. This way may reduce the call jam and balance the loads on the system.

The resource estimator 20 calculates effective performance $Q0(t)$ and $Qi(t)$ of the micro cells and macro cells. The effective resource includes dummy channels and buffers. The performance estimator 30 calculates the failure rate $PH0(t)$ and $Phi(t)$, channel utility of the macro cell and micro cells $U0(t)$ and $Ui(t)$, and estimation (v) of moving customer. The outputs of the fuzzy channel allocation processor is Q1 and Q2. The following table lists the means of Q1 and Q2:

| Q1 | Q2 | Meanings |
|---|---|---|
| 0 | 0 | Using macro cell channel to allocating calls |
| 0 | 1 | Using micro cell channel to allocating calls |
| 1 | 0 | Reject calls to enter into a system |
| 1 | 1 | Reject calls to enter into a system |

In the operation of the fuzzy channel allocation controller, the base station interface module 10 provides resources to various calls. The resource estimator 20 and the performance estimator 30 acquires adaptive information from the system to calculate effective resources and performance estimate of the system adaptives, and then, this message is sent to the fuzzy channel allocation processor 40. Then, the fuzzy channel allocation processor acquires the call allowable threshold and fuzzy channel allocation control message by a fuzzy induction through fuzzy rule and a database according to the received message. Then, the system determines whether to receive a request for allowing a call to enter into the system and which channel is desired to allocated to the call according to the call allowable threshold and fuzzy channel allocation control message. If the system has determined to accept the request, then the following allocation way is allowable:

1. If the new call or handoff call only occurs in the coverage of a macro cell, then the channel of the macro cell is allocated to this call.
2. When the new call or handoff call occurs in the overlapping area of a micro cell and a macro cell, then a channel of the micro cell is allocated to this call or this call is overflowed to the macro cell to used the channel of the macro cell.
3. If the current call in adjacent macro cell is handoff to the overlapping area of the micro cell and macro cell, a channel of the micro cell can be allocated to this handoff call, or the handoff call is underflowed to the micro cell to use the channel of the micro cell.
4. To increase the utility of the micro cell, the call in the macro cell can be reversed to the micro cell.

Figure 2:
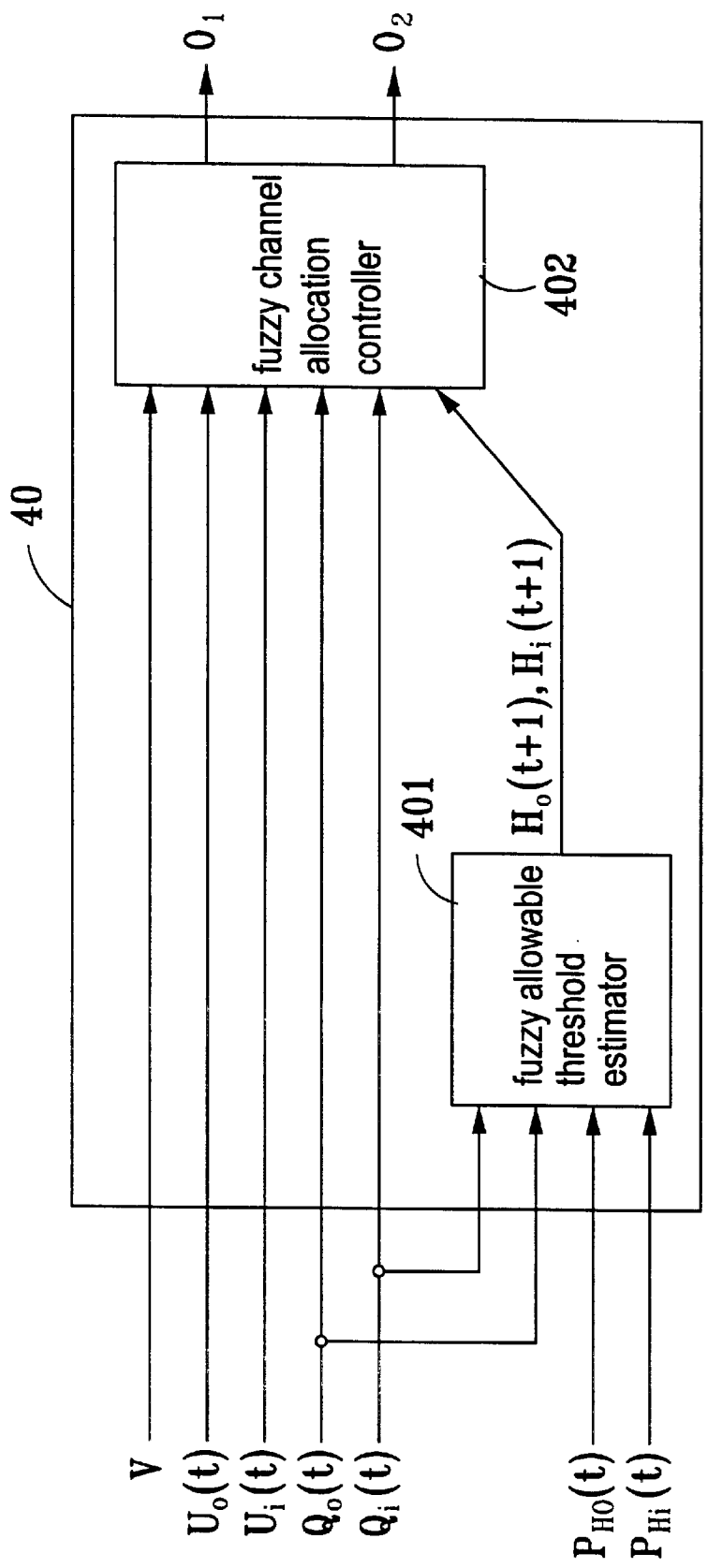
FIG. 2 is a functional block of fuzzy channel allocation controller assuring a quality of service and used in a hierarchical wireless communication system in the present invention.

As shown in FIG. 2, the fuzzy channel allocation processor 40 is designed by a concept of fuzzy multiple layer logic control way for facilitating the complexity of the structure. In the present invention, a two layer fuzzy logic controller is used. The first layer is a fuzzy allowable call threshold estimator 401 and the second layer is a fuzzy channel allocation controller 402. The fuzzy allowable call threshold estimator 401 has variables of handoff call failure rate and available resource and a Sugeno displacement gradient way is used to adjust the call threshold so as to allow the threshold H0(t+1) and Hi(t+1), where "t" represents the new call period, and "t+1" represents next time for generating a call. This call threshold is provided to the second layer, which is used as the fuzzy channel allocation controller allocates fuzzy channels. In the second layer, the fuzzy channel allocation controller 402 has the input variables of handset moving speed, channel utility and available resource. The functions thereof is used in the fuzzy channel allocation for increasing the utility of the channels. The methods for allocating channels in the fuzzy channel allocation controller of the present invention and the prior art have been compared through system simulation, it has proved that the fuzzy channel allocation controller of the present invention substantially sustains the quality of service and has a higher channel utility.

Figure 3:
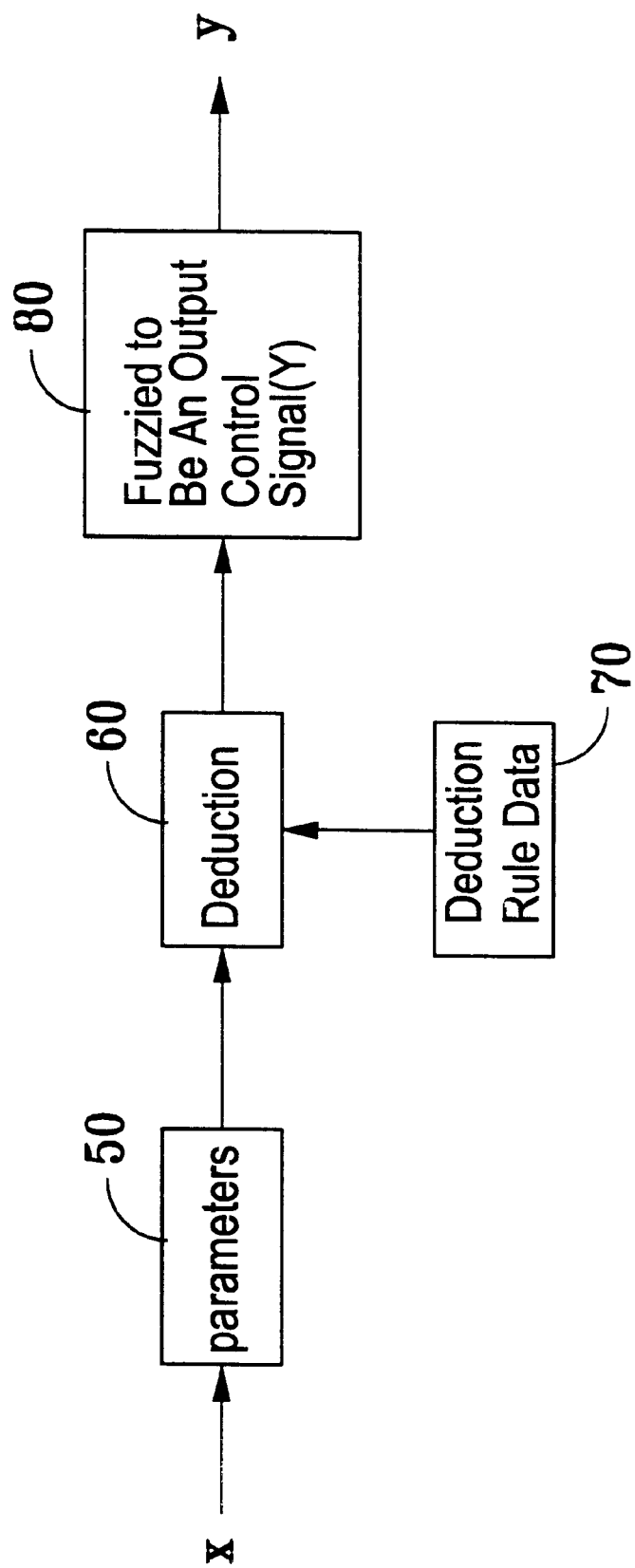
FIG. 3 is a basic function block view of fuzzy channel allocation controller assuring a quality of service and used in a hierarchical wireless communication system in the present invention.

The fuzzy channel allocation controller of the present invention formed by a two layer fuzzy logic controller. The interior of the fuzzy logic controller is illustrated in FIG. 3, wherein the input message (X) is fuzzied to become language parameters (step 50), and is obtained from deduction (step 60). In that deduction, professional knowledge is required to build the deduction rule data (step 70) as a basis in that deduction. Finally, the acquired language result from the deduction is fuzzied (step 80) to be as an output control signal (Y).

Since the present invention is according to the deduction rule database according to fuzzy principle and professional knowledge and a two layer control way is used to reduce the complexity in design. Therefore, the fuzzy logic controller has the following two functions:

1. The call allowable threshold can automatically adjust the function of estimation. This function is primarily set the threshold of the call allowable to enter into the system. The higher the threshold, the lower the possibility for being allowed to enter into the system. If the setting of a new call is different from that of a current handoff call, then different priorities can be identified. In general, the executing handoff call is set with a lower threshold for protecting an executing macro cell now.
2. Fuzzy channel allocation function: in that, the input variable is an available resource which is the sum of moving speed of a handset, available channel numbers, and number of dummy buffers. Then, a min-max deduction method is used as a deduction basis of fuzzy channel allocation. The final result represents whether the call is accepted or is allowable to use the effective resource in the macro cell or micro cell.

The present invention has the following advantages:

1. In the design concept of the fuzzy channel allocation controller, a separable buffer is used to register calls which has no channel allocated temporarily so as to reduce the rate of failure and increase the quality of service of the system.
2. The separable buffer in the fuzzy channel allocation controller make the system can be managed easily, effectively and conveniently.
3. In the design concept of the FCAP, a fuzzy multiple layer logic controller is used for facilitating the complexity in design. In this design, a two layer fuzzy logic control is used so that the design can be facilitated and the complex channel allocation problem.
4. The first layer of the fuzzy channel allocation processor is a fuzzy call allowable threshold estimator which has the function of adaptively adjusting call threshold. Thus, it can be operated in a system with a random processing load. In the fuzzy deduction method, a Sugeno displacement gradient way is used to adaptively adjust the call threshold.
5. Different allowable call threshold are used in different calls for achieving different call priority. For example, the allowable call threshold is set to be large than the allowable call threshold of handoff calls for achieving different priority.
6. The second layer of the fuzzy channel allocation processor is a fuzzy channel allocator. The input variables of the fuzzy channel allocator are selected from effective system messages. For example, moving speed of a handset, available channel numbers, and number of dummy buffers. Then, a min-max deduction method is used as a deduction basis of fuzzy channel allocation. The final result represents whether the call is accepted or is allowable to use the effective resource in the macro cell or micro cell.
7. The fuzzy channel allocation processor is according to the fuzzy theory, the decision of output is a soft decision.
8. The present invention has been proved that it can balance the channel utility between the micro cell and macro cell so as to achieve a higher channel utility higher than that in the prior art designs.
9. The quality of service is sustained.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A fuzzy channel allocation controller assuring a quality of service and used in a hierarchical wireless communication system, the system having a macro cell and a plurality of micro cells which includes a base station interface module, a resource estimator, a performance estimator and a fuzzy channel allocation processor;

wherein the base station interface module provides an interface circuit to be interfaced with a base station, and provides separate buffers for registering calls temporarily; the resource estimator calculates effective resources as a call occurs, including space channels and buffers; and the performance estimator adaptively estimates performance of the system;

wherein the fuzzy channel allocation controller provides a threshold for allowing a call entering into the system to be adaptively adjusted according to/system conditions so that the calls are sustained in a predetermined quality; further, in allocating channels, the loads of the macro cell and micro cells are balanced so that the system has a higher channel utility, the fuzzy channel allocation processor being a two layer fuzzy logic controller; a first layer being a fuzzy allowable call threshold estimator and a second layer being a fuzzy channel allocation controller; the fuzzy allowable call threshold estimator having variables of handoff call failure rate and available resources, and a Sugeno displacement gradient method for use in adjusting the call threshold for achieving various priorities; in the second layer, the fuzzy channel allocator has the input variables of effective messages, then carries out a min-max deduction method, and establishes a final result representing whether the call is accepted and whether it is allocated with effective resources in the macro cell or micro cells.

2. The fuzzy channel allocation controller assuring a quality of service as claimed in claim 1, wherein the base station interface module includes buffers to store different calls temporarily; in the macro cell, Nna buffers are provided for new calls, Nha buffers are provided for handoff calls from proximate macro cells, and Nho buffers are provided for overflow handoff calls of a micro cell; the base station interface module provides Nni buffers for new calls in the micro cells; Nhui buffers are provided for underflow handoff calls of a macro cell; Nhi buffers are provided for handoff calls of proximate micro cells; when dummy channels exist in one micro cell, a calling reverse flow is executed in a macro cell to allow a call handoff to the channels of micro cells to reduce a call jam and balance loads on the system.

3. The fuzzy channel allocation controller assuring a quality of service as claimed in claim 1, wherein the buffers of the base station interface module are separate buffers for storing calls not being stored in a dummy channel to reduce failure rates.

4. A fuzzy channel allocation controller assuring a quality of service and used in a hierarchical wireless communication system, the system having a macro cell and a plurality of micro cells which includes a base station interface module, a resource estimator, a performance estimator and a fuzzy channel allocation processor;

wherein the base station interface module provides an interface circuit to be interfaced with a base station, and provides separate buffers for registering calls temporarily; the resource estimator calculates effective resources as a call occurs, including space channels and buffers; and the performance estimator adaptively estimates performance of the system;

wherein the fuzzy channel allocation controller provides a threshold for allowing a call entering into the system to be adaptively adjusted according to system conditions so that the calls are sustained in a predetermined quality; further, in allocating channels, the loads of the macro cell and micro cells are balanced so that the system has a higher channel utility;

wherein the base station interface module includes buffers to store different calls temporarily, the buffers in the base station interface module being separate buffers for storing calls not being stored in a dummy channel to reduce failure rates, in the macro cell, Nna buffers are provided for new calls, Nha buffers are provided for handoff calls from proximate macro cells, and Nho buffers are provided for overflow handoff calls of a micro cell; the base station interface module provides Nni buffers for new calls in the micro cells; Nhui buffers are provided for underflow handoff calls of a macro cell, Nhi buffers are provided for handoff calls of proximate micro cells, when dummy channels exist in one micro cell, a calling reverse flow is executed in a macro cell to allow a call handoff to the channels of micro cells to reduce a call jam and balance loads on the system;

wherein the fuzzy channel allocation processor is a two layer fuzzy logic controller; a first layer is a fuzzy allowable call threshold estimator and a second layer is a fuzzy channel allocation controller; the fuzzy allowable call threshold estimator has variables of handoff call failure rate and available resources, and a Sugeno displacement gradient method is used to adjust the call threshold for achieving various priorities; in the second layer, the fuzzy channel allocator has the input variables of effective messages, then carries out a min-max deduction method, and establishes a final result representing whether the call is accepted and whether it is allocated with effective resources in the macro cell or micro cells.

* * * * *